(12) United States Patent
Cross et al.

(10) Patent No.: US 7,399,457 B2
(45) Date of Patent: Jul. 15, 2008

(54) PROCESS FOR THE REMOVAL OF HEAVY METALS FROM GASES, AND COMPOSITIONS THEREFOR AND THEREWITH

(75) Inventors: Joseph B. Cross, Bartlesville, OK (US); Glenn W. Dodwell, Bartlesville, OK (US); Jianhua Yao, Bartlesville, OK (US); Marvin M. Johnson, Bartlesville, OK (US); Edward L. Sughrue, II, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 346 days.

(21) Appl. No.: 11/103,903

(22) Filed: Apr. 12, 2005

(65) Prior Publication Data

US 2006/0228280 A1    Oct. 12, 2006

(51) Int. Cl.
*B01D 53/64* (2006.01)
*B01J 21/08* (2006.01)
*B01J 23/22* (2006.01)
*B01J 37/00* (2006.01)

(52) U.S. Cl. .............. 423/210; 502/246; 502/247; 502/353; 502/407; 502/514; 502/516

(58) Field of Classification Search ............ 502/246, 502/247, 353, 407, 514, 516; 423/210
See application file for complete search history.

(56) References Cited

U.S. PATENT DOCUMENTS

| | | | | |
|---|---|---|---|---|
| 2,945,824 A | * | 7/1960 | Fleck .................... | 502/216 |
| 3,055,842 A | * | 9/1962 | Robinson ................ | 502/353 |
| 3,107,223 A | * | 10/1963 | Wainwright et al. ..... | 502/159 |
| 3,207,703 A | * | 9/1965 | Duffy et al. ............ | 502/247 |
| 4,517,389 A | | 5/1985 | Katsumata et al. ....... | 568/804 |
| 4,607,129 A | | 8/1986 | Lee ..................... | 585/415 |
| 4,769,477 A | | 9/1988 | Bergna ................... | 549/259 |
| 4,814,317 A | | 3/1989 | Saleh et al. ............. | 502/350 |
| 4,835,126 A | | 5/1989 | Wachs et al. ............ | 502/209 |
| 4,874,525 A | | 10/1989 | Markovs ................ | 210/673 |
| 4,940,686 A | | 7/1990 | Tooley et al. ........... | 502/327 |
| 5,096,681 A | * | 3/1992 | Cheung ................. | 423/245.1 |
| 5,139,756 A | | 8/1992 | Shikada et al. ......... | 423/237 |
| 5,354,357 A | | 10/1994 | Markovs et al. ........ | 75/670 |
| 5,409,522 A | | 4/1995 | Durham et al. .......... | 75/670 |
| 5,607,496 A | | 3/1997 | Brooks ................... | 75/670 |
| 5,986,110 A | | 11/1999 | Geus et al. ............. | 549/259 |
| 6,027,697 A | | 2/2000 | Kurihara et al. ......... | 422/171 |
| 6,248,217 B1 | | 6/2001 | Biswas et al. .......... | 204/157.4 |
| 6,350,918 B2 | | 2/2002 | Wachs et al. ........... | 568/471 |

OTHER PUBLICATIONS

Research Disclosure-Dec. 1998/1569 No. 41604, disclosed by Shell International B.V.
European Patent Application No. 0 768 110 A1 Published Apr. 16, 1997, Boxhoorn et al.
Article Entitled "SCR Catalyst Improvements" found on the internet at www.netl.doe.gov/publications/proceedings/99/99scr-sncr/enevolds.pdf.
Article entitled "Special Report: Emissions Control; Emissions—Control technologies continue to clear the air", Power Magazine, May/Jun. 2002, by Robert Swanekamp http://www.platts.com/engineering/issues/Power/0205/0205pwr_sr-emissions.shtml.
A Project Fact Sheet entitled "SNOX™ Flue Gas Cleaning Demonstration Project", DOE by Paul Yosick http://www.lanl.gov/projects/cctc/factsheets/snox/snoxtmdemo.html.
A.F.Wells, *Structural Inorganic Chemistry*, pp. 565-569, 1984.
PCT/US99/19612, Kourtakis, International Filing Date: Aug. 25, 1999.

* cited by examiner

*Primary Examiner*—Timothy C Vanoy
(74) *Attorney, Agent, or Firm*—Jeffrey R. Anderson

(57) ABSTRACT

A composition containing silica and vanadium, wherein at least a portion of the vanadium is present as a distorted octahedral and in a phase selected from the group consisting of amorphous, nano-crystalline, and combinations thereof, is disclosed. A method of preparing such composition is also disclosed. The composition is employed in a process to remove a heavy metal from a gaseous feed stream which can optionally include a separate heavy metal adsorption stage.

119 Claims, 6 Drawing Sheets

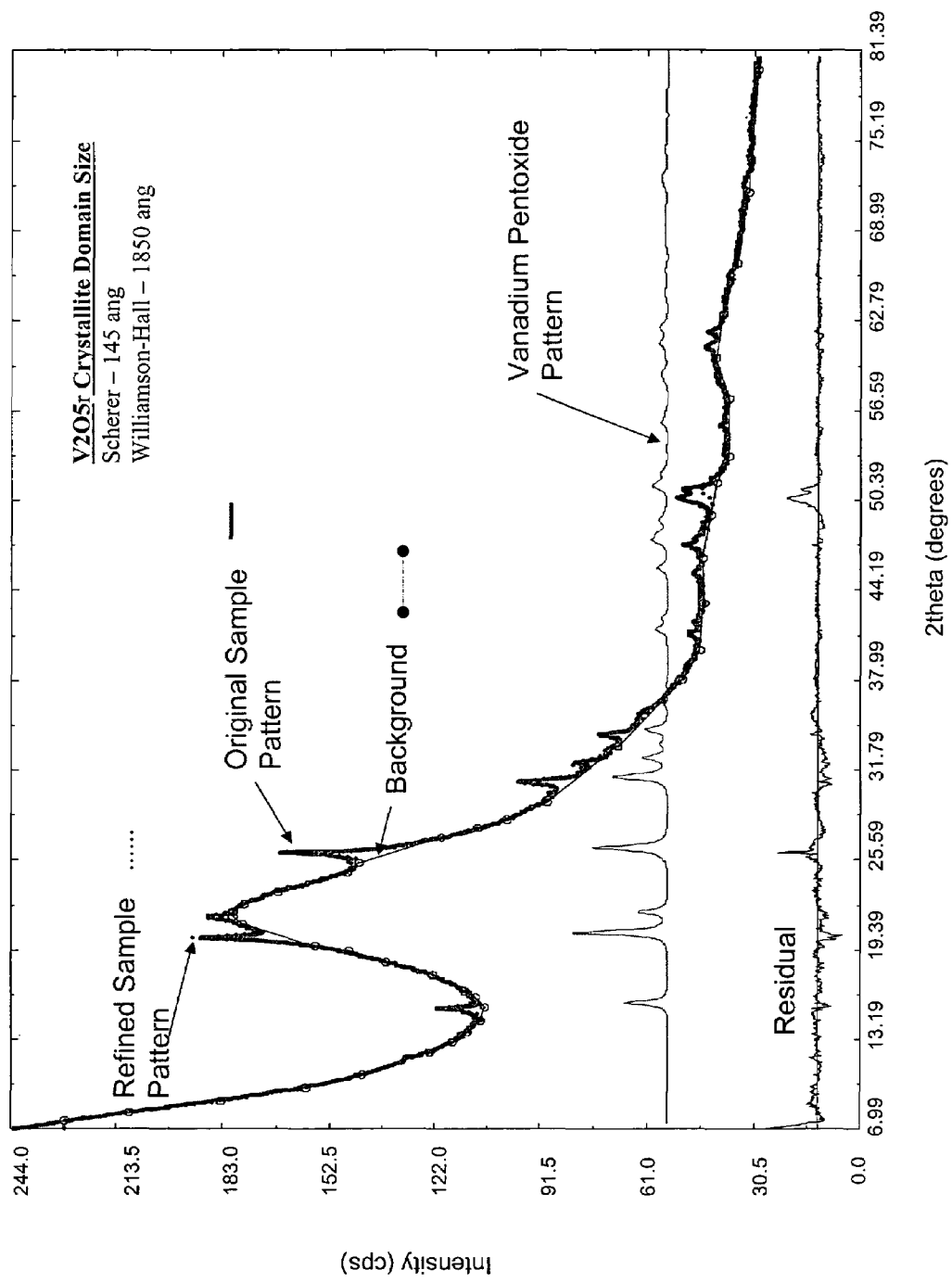
Figure 5. Calcined at 300 C

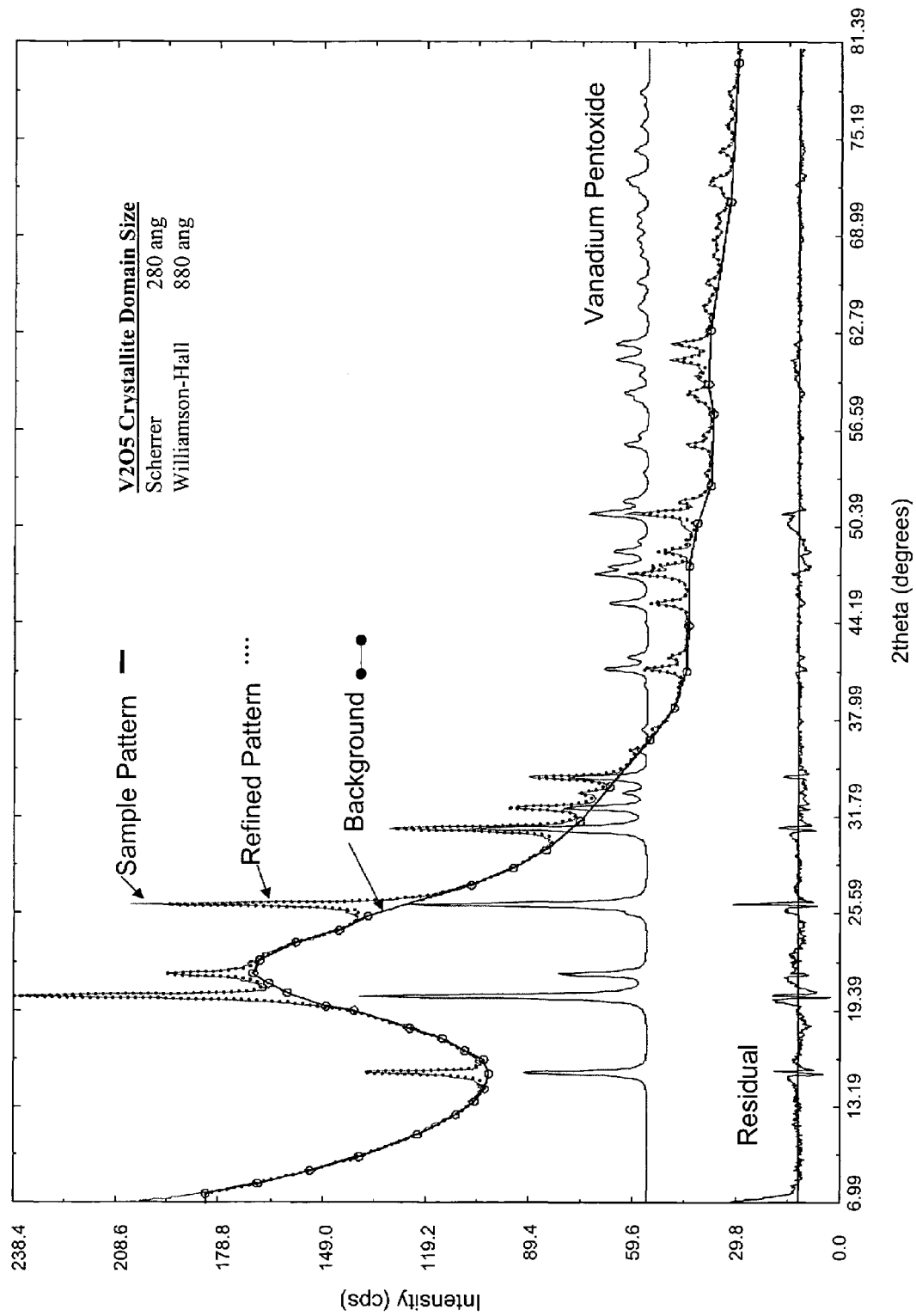
Figure 6. Calcined at 450 C

PROCESS FOR THE REMOVAL OF HEAVY METALS FROM GASES, AND COMPOSITIONS THEREFOR AND THEREWITH

The invention relates to a composition useful in the removal of heavy metals from a gaseous feed stream. In one aspect the invention relates to a method of preparing such composition. In yet another aspect the invention relates to a method of removing heavy metals from a gaseous feed stream using the inventive composition.

BACKGROUND OF THE INVENTION

Heavy metals are released during the combustion process of many fossil fuels and/or waste materials. These heavy metals include, for example, arsenic, beryllium, lead, cadmium, chromium, nickel, zinc, mercury and barium. Most of these heavy metals are toxic to humans and animals. In particular, lead is thought to compromise the health and mental acuity of young children and fetuses.

Furthermore, there is every indication that the amount of mercury, and possibly of other heavy metals, now legally allowed to be released by those combusting various fossil fuels and/or waste materials, including coal burning powerplants, and petroleum refineries, will be reduced by future legislation. While a variety of adsorbents are available for capture of heavy metals (in particular mercury), these adsorbents tend to have low capacities and are easily deactivated by other components in the gas stream, such as sulfur and nitrogen oxides. We have discovered a material that converts an elemental heavy metal to an oxidation state greater than zero, even in the presence of sulfur oxides and/or nitrogen oxides.

SUMMARY OF THE INVENTION

It is an object of this invention to provide an improved vanadium material which when used in the removal of heavy metal results in oxidation of the heavy metal to an oxidation state greater than zero, even in the presence of sulfur oxides and nitrogen oxides.

A further object of this invention is to provide a method for making an improved vanadium material which when used in the removal of heavy metal results in oxidation of the heavy metal to an oxidation state greater than zero, even in the presence of sulfur oxides and nitrogen oxides.

Another object of this invention is to provide an improved process for the removal of heavy metal from a heavy metal containing gas which results in oxidation of the heavy metal to an oxidation state greater than zero, even in the presence of sulfur oxides and nitrogen oxides, with an optional second stage for adsorption of oxidized heavy metal.

In accordance with a first embodiment of the invention, the inventive composition comprises silica and vanadium wherein at least a portion of the vanadium is present as a distorted octahedral and in a phase selected from the group consisting of amorphous, nano-crystalline, and combinations thereof.

In accordance with a second embodiment of the invention, the inventive composition comprises silica and vanadium heated in the presence of oxygen and a solvent to a calcination temperature, followed by hydration; wherein the calcination temperature is sufficient to volatilize and remove substantially all of the solvent; and wherein the calcination temperature is below the temperature which would result in the conversion of greater than about 90 weight percent of the vanadium to vanadium-and-oxygen-containing crystallites greater than about 100 Å in size.

In accordance with a third embodiment of the invention, the inventive composition can be prepared by the method of:
a) incorporating a vanadium compound onto, into, or onto and into silica, in the presence of an oxidizing agent and a solvent, to thereby form a vanadium incorporated silica; and
b) calcining the vanadium incorporated silica in the presence of oxygen and the solvent at a calcination temperature; wherein the calcination temperature is sufficient to volatilize and remove substantially all of the solvent; and wherein the calcination temperature is below the temperature which would result in the conversion of greater than about 90 weight percent of the vanadium to vanadium-and-oxygen-containing crystallites greater than about 100 Å in size, to thereby form the composition.

In accordance with a fourth embodiment of the invention, the inventive composition can be used in the removal of heavy metal from a gaseous feed stream comprising heavy metal by contacting, in a contacting zone, the gaseous feed stream with any of the inventive compositions of embodiments one through three above, with an optional second stage for adsorption of oxidized heavy metal.

Other objects and advantages of the invention will become apparent from the detailed description and the appended claims.

BRIEF DESCRIPTION OF THE DRAWINGS

FIG. 5 is a graphic illustration of X-ray diffraction measurements of Sorbent A calcined at 300° C.

FIG. 6 is a graphic illustration of X-ray diffraction measurements of Sorbent A calcined at 450° C.

DETAILED DESCRIPTION OF THE INVENTION

Figure 1:
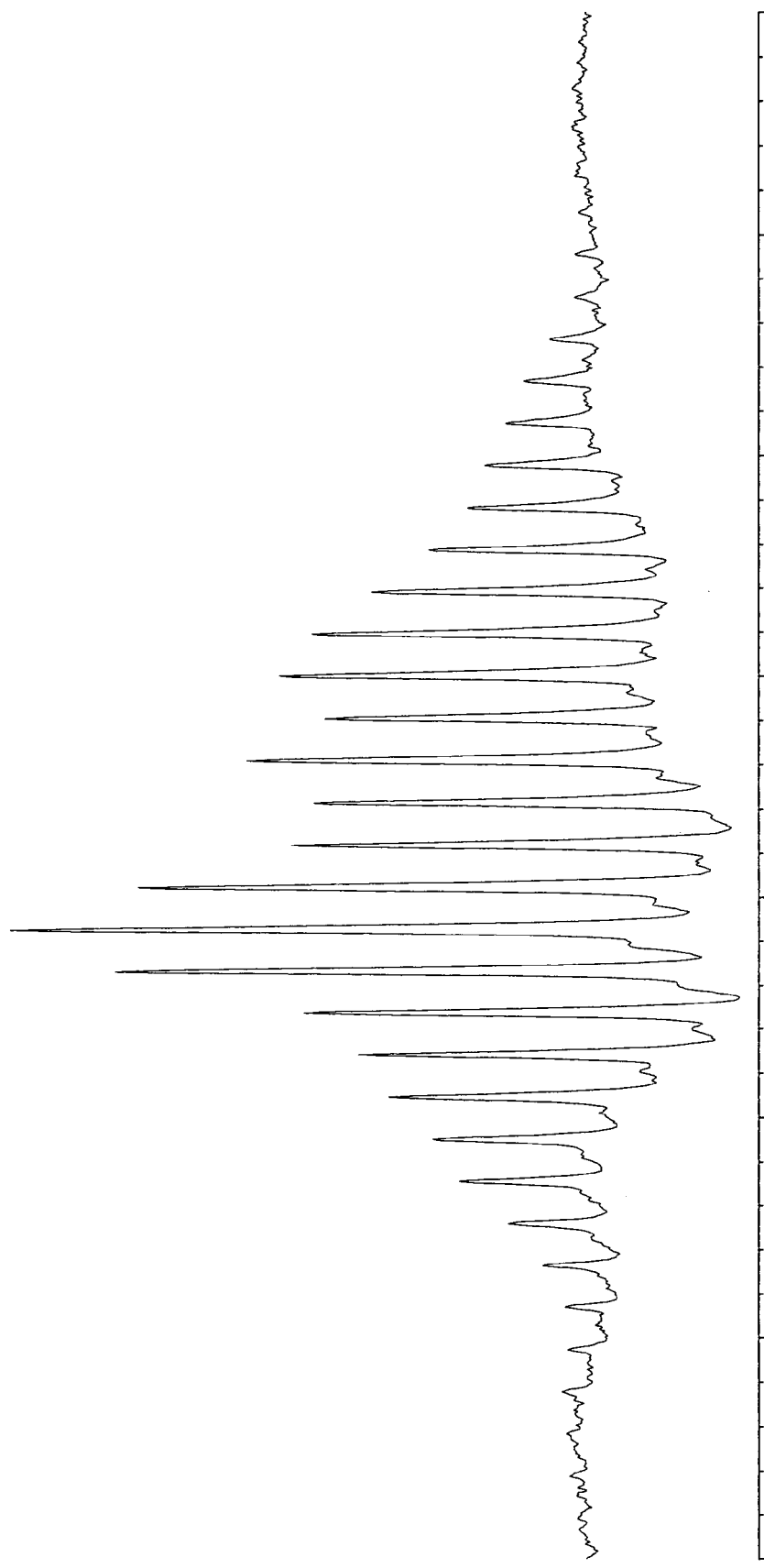
FIG. 1 is a graphic illustration of V-51 Magic Angle Spinning Spectra, at 10 kHz, of Sorbent A calcined at 300° C.

In accordance with the first embodiment, the composition comprises, consists of, or consists essentially of silica and vanadium wherein at least a portion, preferably at least about 10 wt. %, more preferably at least about 80 wt. %, and most preferably at least about 95 wt. %, of said vanadium is present as a distorted octahedral in a phase selected from the group consisting of amorphous, nano-crystalline, and combinations thereof.

In accordance with the second embodiment of the present invention, the composition comprises, consists of, or consists essentially of silica and vanadium heated in the presence of oxygen and a solvent to a calcination temperature, followed by hydration; wherein the calcination temperature is sufficient to volatilize and remove substantially all of the solvent; and wherein the calcination temperature is below the temperature which would result in the conversion of greater than about 90 weight % of the vanadium to vanadium-and-oxygen-containing crystallites greater than about 100 Å in size. The calcination temperature is preferably below about 325° C., more preferably below about 300° C., and most preferably below about 275° C.

The solvent is preferably an aqueous solution of oxalic acid. The composition is calcined for a time period preferably in the range of from about 0.1 to about 24 hours, more preferably in the range of from about 1 to about 4 hours.

In accordance with the third embodiment of the present invention, the composition can be prepared by the method of: a) incorporating a vanadium compound onto, into, or onto and into silica, in the presence of an oxidizing agent and a solvent, to thereby form a vanadium incorporated silica; and b) calcining the vanadium incorporated silica in the presence of oxygen and the solvent at a calcination temperature; wherein the calcination temperature is sufficient to volatilize and remove substantially all of the solvent, and wherein the calcination temperature is below the temperature which would result in the conversion of greater than about 90 wt. % of the vanadium to vanadium-and-oxygen containing crystallites greater than about 100 Å in size. The calcination temperature is preferably below about 325° C., more preferably below about 300° C., and most preferably below about 275° C.

The vanadium compound can be any vanadium containing compound capable of incorporation onto and/or into a support. Preferably, the vanadium compound is selected from the group consisting of 1) ammonium metavanadate, 2) an alkali metavanadate of the formula $MVO_3$, wherein M can be an alkali metal selected from Group IA, and 3) combinations of any two or more thereof. The most preferable vanadium compound is ammonium metavanadate.

The oxidizing agent can be any agent capable of oxidizing vanadium, and preferably is hydrogen peroxide or oxygen. The solvent is preferably an aqueous solution of oxalic acid. Also, the calcination time period is as described in the second embodiment.

The vanadium compound can be incorporated into, onto, or onto and into the silica by any suitable method known to those skilled in the art. Preferably, the vanadium compound is incorporated into, onto, or into and onto the silica by incipient wetness impregnation.

During the calcining step, preferably at least 90 wt. % of the solvent present in the incorporating step is removed.

The following discussion applies to each of the compositions of the first through the third embodiments of the present invention.

The silica has a surface area in the range of from about 20 $m^2/gm$ to about 800 $m^2/gm$, preferably from about 100 $m^2/gm$ to about 500 $m^2/gm$. Also the composition is preferably hydrated.

At least a portion, preferably at least about 10 weight percent, more preferably at least about 80 weight percent, and most preferably at least about 95 weight percent, of the vanadium of the composition has crystalite sizes of less than about 100 Å, more preferably less than about 30 Å, and most preferably less than about 20 Å as determined by an analytical method such as X-Ray diffraction.

Preferably, less than about 20 wt. percent, and more preferably less than about 5 wt. percent, of the vanadium is present as crystalline $V_2O_5$ as determined by an analytical method such as X-Ray Diffraction.

In addition, at least a portion, preferably at least about 10 wt. %, more preferably at least about 80 wt. %, and most preferably at least about 95 wt. % of the vanadium is present in the composition in the form of an oxide of vanadium having oxygen atoms as its six nearest neighbors.

Additionally, the vanadium is present in the composition, on an elemental vanadium basis, in an amount in the range of about 0.5 to about 50 wt. %, preferably from about 1 to about 20 wt. %, and most preferably from about 1.5 to about 15 wt. %, based on the total weight of the composition.

In accordance with the fourth embodiment of the present invention, the inventive composition can be used in the removal of heavy metal from a gaseous feed stream comprising a heavy metal and oxygen by a process comprising, consisting of, or consisting essentially of contacting, in a contacting zone, under heavy metal removal conditions, the gaseous feed stream with any of the inventive compositions, and combinations thereof, of embodiments one through three above. A gaseous product stream is withdrawn from the contacting zone. The gaseous feed stream is typically a combustion gas; and is more typically a stack gas derived from the combustion of coal. The gaseous feed stream can also further comprise contaminants selected from the group consisting of sulfur oxides, $CO_2$, water, nitrogen oxides, HCl, and combinations of any two or more thereof.

The contacting of the gaseous feed stream with the inventive composition is preferably carried out at a temperature in the range of from about 100 to about 325° C., more preferably from about 125 to about 275° C., and most preferably from about 150 to about 225° C.

The heavy metal typically comprises a metal selected from the group consisting of arsenic, beryllium, lead, cadmium, chromium, nickel, zinc, mercury, barium, and combinations of any two or more thereof. The heavy metal most typically comprises mercury.

When the heavy metal is mercury, the mercury is typically present in the gaseous feed stream in an amount in the range of from about 0.1 to about 10,000 $\mu g/m^3$, more typically in the range of from about 1 to about 800 $\mu g/m^3$ and most typically from about 3 to about 700 $\mu g/m^3$.

The composition preferably converts at least a portion of the heavy metal in the gaseous feed stream to an elevated oxidation state. In the case of mercury, the composition preferably converts at least a portion of the mercury contained in the gaseous feed stream from a zero oxidation state to a +1 or a +2 oxidation state and also preferably removes mercury. "At least a portion", as used in this paragraph, can mean at least 20 weight %, preferably at least 30 weight %, and more preferably at least 50 weight % mercury based on the total amount of mercury contained in the gaseous feed stream.

The gaseous product stream preferably contains less than about 20 weight %, more preferably less than about 10 weight %, and most preferably less than about 5 weight % of the mercury contained in the gaseous feed stream.

The gaseous product stream is optionally contacted with a separate adsorbent in an adsorption zone. The adsorbent can be any adsorbent capable of adsorbing a heavy metal. More preferably, the adsorbent comprises, consists of or consists essentially of a material selected from the group consisting of a zeolite, amorphous carbon, and combinations thereof. The amorphous carbon can be an activated carbon or an activated charcoal. A treated gaseous product stream is withdrawn from the adsorption zone and contains less than about 20 weight %, preferably less than about 10 weight %, and more preferably less than about 5 weight % of the heavy metal contained in the gaseous feed stream.

EXAMPLES

The following examples are intended to be illustrative of the present invention and to teach one of ordinary skill in the art to make and use the invention. These examples are not intended to limit the invention in any way.

Preparation of Sorbents

Sorbent A—Around 11 wt. % V on Silica

A 51.4 gram quantity of ammonium metavanadate ($NH_4VO_3$) was dissolved in 440 grams of a 2 Molar oxalic acid solution using a stirred hotplate. To this solution, 30% hydrogen peroxide was added dropwise to maintain a reddish color. The vanadium containing solution was then added to 200 grams of 20/40 mesh SMR 1-57-023 silica obtained from W. R. Grace using the following procedure. First, the solution was divided into four equal portions. After one portion was solution impregnated onto the silica, the solid was dried at 120° C. This step was repeated with the three other portions of solution with the drying time varying between one and three hours. Then, 20 gram samples of this material were calcined for 1.5 hours at temperatures ranging from 300° to 500° C.

Sorbent B—Around 3 wt. % V on Silica

A 1.54 gram quantity of ammonium metavanadate ($NH_4VO_3$) was added to 9.0 grams of a 2.0 Molar oxalic acid solution. After mixing with 15 grams of distilled water, 3 drops of a 30% hydrogen peroxide solution was added. This vanadium containing solution was then impregnated on 26 grams of 20/40 mesh SMR 1-57-023 silica obtained from W. R. Grace. The impregnated solid was then heated in a furnace for 2 hours at 225° C.

Sorbent C—Around 7 wt. % V on Silica

A 2.57 gram quantity of ammonium metavanadate ($NH_4VO_3$) was added to 15 ml of a 2.0 M oxalic acid solution. After adding 5 grams of distilled water, 3 drops of a 30% hydrogen peroxide solution was added. This vanadium containing solution was then impregnated on 20 grams of 20/40 mesh SMR 1-57-023 silica obtained from W. R. Grace. The impregnated solid was then heated in a furnace for 2 hours at 200° C.

Evaluation of Sorbents to Remove Mercury

The following general procedure was used to test the ability of the sorbent to remove mercury from a gas stream. Mercury is added by passing the gas stream at room temperature through a gas bottle containing elemental mercury. The mercury containing gas stream is then passed through a sample tube containing approximately 0.5 to 1.5 grams of material to be tested. The tube is located in a furnace wherein the temperature can range from 110° to 170° C. The efficiency of mercury removal is determined by measuring the amount of mercury entering and leaving the solid sorbent and is defined as the difference between the inlet and outlet mercury concentrations divided by the inlet concentration. These concentrations were determined by using a Jerome Mercury Analyzer that measures only elemental mercury or a PS Analytical Mercury Analyzer that measures both oxidized and elemental mercury.

Initial tests were run using mercury in dry air. To add moisture, the gas stream was passed through a water bubbler (e.g., at a temperature of 50° C., the gas stream will contain 10% water vapor). Other gases were added including $SO_2$, $NO_2$, NO, and HCl. These gases were added using the following standard blends. For $SO_2$, the standard contained 64% $N_2$, 12% $O_2$, 24% $CO_2$, and 3200 ppm $SO_2$; for $NO_2$, the standard contained 200 ppm $NO_2$ in $N_2$; for NO, the standard contained 200 ppm NO in $N_2$; for HCl the standard contained 1200 ppm HCl in $N_2$.

Run 1. The table below summarizes the results obtained when passing mercury in moist air over Sorbent A (around 11 wt. % V on silica) that had been calcined at various temperatures. In all cases, the adsorption temperature is 150° C. while the flow rates ranged from 100 to 175 ml/min of air and the gas hourly space velocity ranged from 5,000 to 15,000 hour$^{-1}$.

TABLE 1

Removal efficiency of mercury for Sorbent A.

| Calcination Temperature (° C.) | Time on Stream (hours) | Removal Efficiency (%) |
|---|---|---|
| 300 | 1 | 99 |
|  | 200 | 99 |
|  | 650 | 70 |
| 350 | 1 | 97 |
|  | 120 | 68 |
| 450 | 1 | 66 |
|  | 11 | 55 |

The results in Table 1 clearly indicate that the efficiency of mercury removal depends upon calcination temperature of the sorbent with the 300° C. calcined sample being most effective for mercury removal.

Run 2. Mercury in moist air was passed over Sorbent B (around 3 wt. % V on silica) that had not been hydrated before use. The adsorption temperature was 150° C. while the flow rates ranged from 100 to 175 ml/min of air and the gas hourly space velocity ranged from 5,000 to 15,000 hour$^{-1}$.

Run 3. Mercury in moist air was passed over Sorbent B (around 3 wt. % V on silica) that had been hydrated before use. The adsorption temperature was 150° C. while the flow rates ranged from 100 to 175 ml/min of air and the gas hourly space velocity ranged from 5,000 to 15,000 hour$^{-1}$.

The hydrated sample of Sorbent B in Run 3 gave a mercury removal efficiency of greater than 99 percent after 500 hours on stream while for the non-hydrated sample of Sorbent B in Run 2, the mercury removal efficiency decreased to 55 percent after 300 hours on stream.

Run 4. Sorbent C (around 7 wt. % vanadium) was evaluated for its ability to remove mercury from a gas stream containing 72 wt. % $N_2$, 10 wt. % $CO_2$, 10 wt. % $H_2O$, 1880 ppm $SO_2$, 430 ppm NO, 40 ppm $NO_2$, and 20 ppm HCl with the balance being $O_2$. The adsorption temperature was set at 150° C. while the gas flow rate was 650 ml/min. Two samples were evaluated. The first was dried before use while the second was hydrated with 200° C. moist air for 1.5 hours before use. The hydrated sample demonstrated a mercury removal efficiency of 99 percent while the mercury removal efficiency for the dried sample was 25 percent.

Characterization of Sorbents

In an effort to understand the relationship between structure and performance, a variety of techniques were used to characterize the sorbents. These include nuclear magnetic resonance and X-ray diffraction. Description of these techniques and the results obtained are given below.

Solid-state $^{51}$V NMR using magic angle spinning (MAS) and static wideline methods were used to characterize some of the sorbents. Spectra were obtained on a Varian INOVA 400 NMR spectrometer, operating at 399.8 MHz for $^1$H, and 105.1 MHz for $^{51}$V, using a Chemagnetics CP/MAS probe with 5 mm white zirconia rotors spinning at 10 to 12 KHz, or non-spinning (static). A single pulse sequence with 2 μs pulse (<45°) and one second delay was used for all measurements. The spinning spectra were processed by using 500 Hz of Lorentzian line broadening and phasing close to the same phasing parameters. For the static specta, 1000 Hz of line broadening was used. $^{51}$V chemical shift was determined by using $NH_4VO_3$ as a secondary chemical shift reference at −576 ppm ($VOCl_3$ at 0 ppm). This was accomplished by running the sample at two different spinning frequencies, 10 and 12 kHz, to distinguish the isotropic chemical shift peak from the sidebands. The results for selected samples are given below.

TABLE 2

NMR Results for Samples of Vanadium on Silica.

| Sorbent | Description | Isotropic Chemical Shift, δi, MAS (ppm) | Linewidth at Half-Height (Hz) MAS | Second Principal Component of Chemical Shift Anisotropy, $δ_{22}$ static (ppm) |
|---|---|---|---|---|
| A | 300° C. Calcination | −619 | 2093 | −302 |
| A | 450° C. Calcination | −621 | 2005 | −300 |
| B | 225° C. Calcination Hydrated | −606 | 6967 | −305 |
| B | 225° C. Calcination Dried | −595 | 7185 | −479 |

Sorbent A—(Around 11 wt. % Vanadium)

Figure 2:
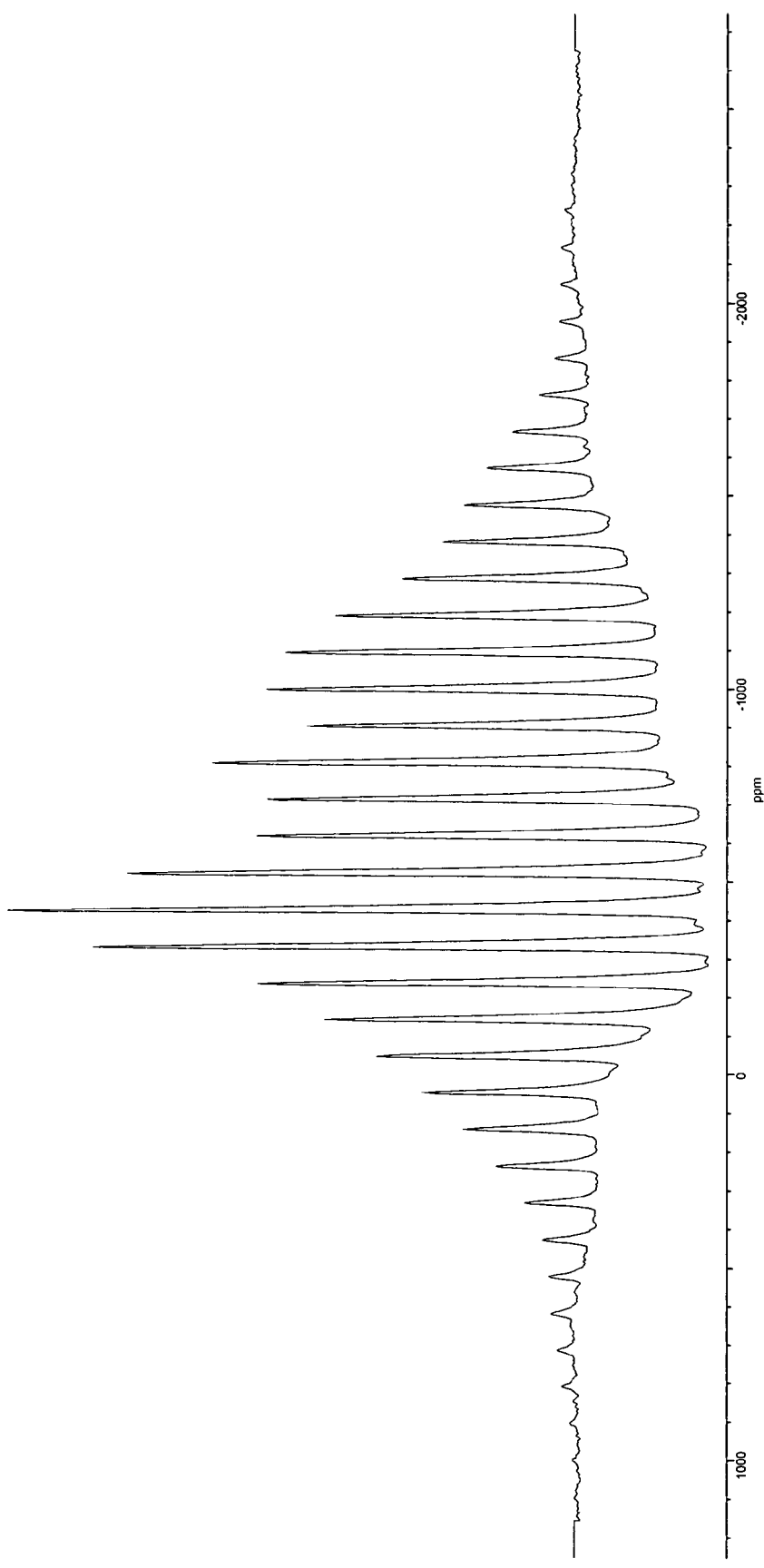
FIG. 2 is a graphic illustration of V-51 Magic Angle Spinning Spectra, at 10 kHz, of Sorbent A calcined at 450° C.
Figure 3:
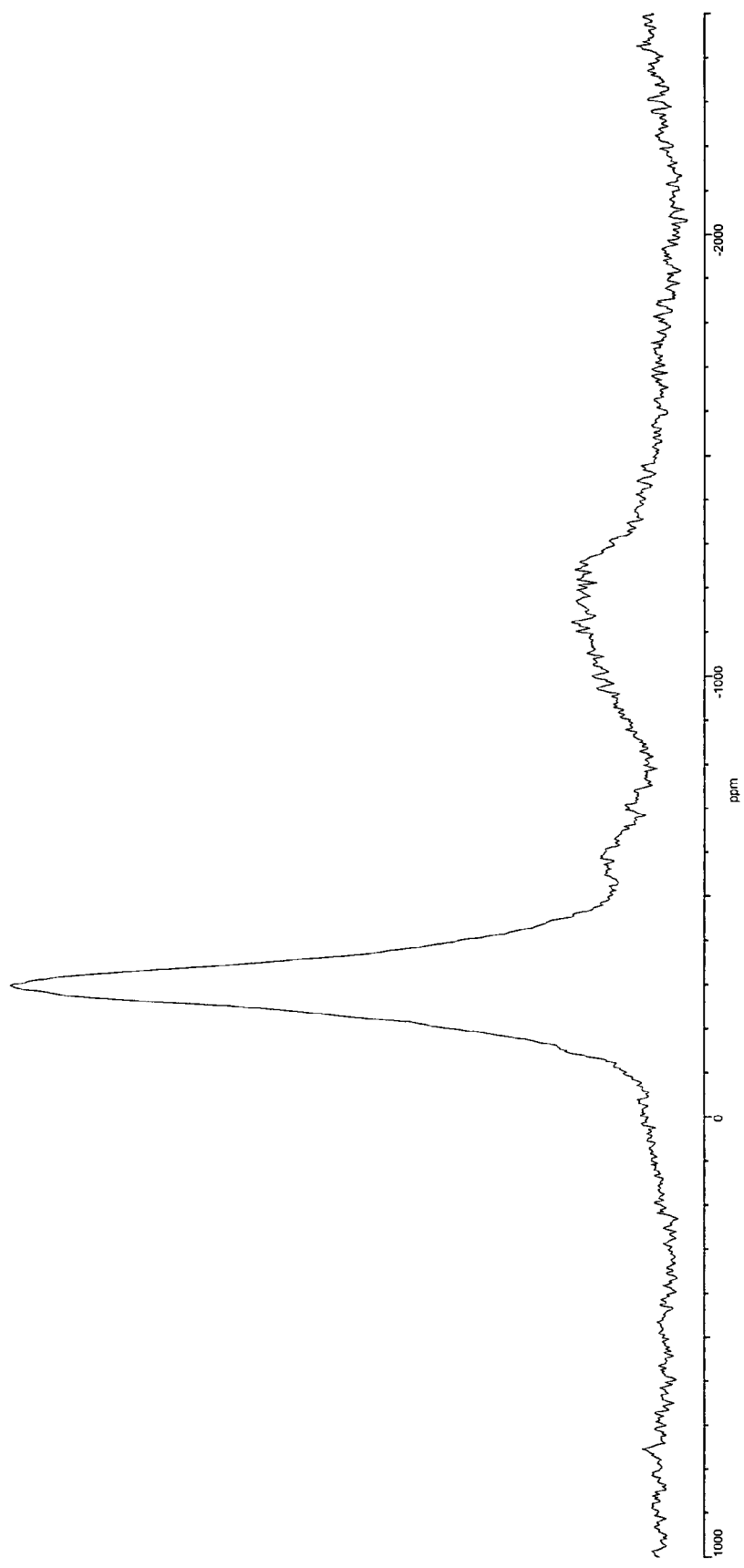
FIG. 3 is a graphic illustration of V-51 static spectra of Sorbent A calcined at 300° C.
Figure 4:
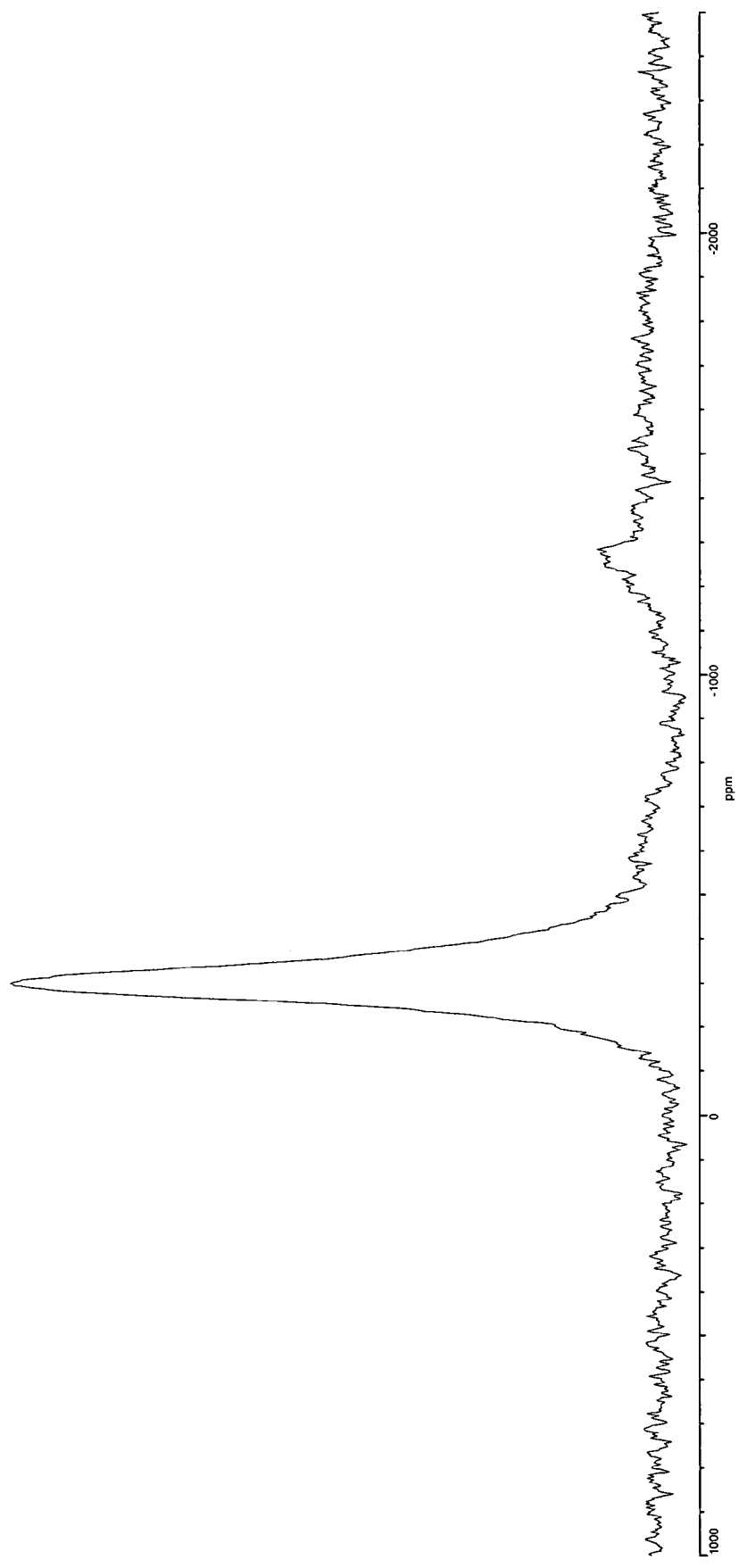
FIG. 4 is a graphic illustration of V-51 static spectra of Sorbent A calcined at 450° C.

The NMR results of Table 2 indicate that both of the Sorbent A samples contain crystalline $V_2O_5$. However, detailed analysis of both the spinning and static spectra shown in FIGS. 1-4 suggest that the 300° C. calcined sample has a considerable amount of an amorphous vanadium phase while most of the vanadium in the 450° C. calcined sample is crystalline. For example, with reference to FIGS. 1 and 2, there are small underlying peaks in the spinning spectrum of the 300° C. calcined sample (FIG. 1) not present in the spinning spectrum of the 450° C. calcined sample (FIG. 2). In addition, with reference to FIGS. 3 and 4, the static spectra of these two samples are also different. In particular, the static spectrum for the 300° C. calcined sample contains some extra features which are suggestive of an amorphous phase.

X-ray diffraction measurements were made on a PanAnalytical Expert Pro Diffractometer with an accelerator linear array detector and a copper Kα source. With reference to FIGS. 5 and 6, the 450° C. calcined Sorbent A sample (FIG. 6) shows evidence of crystalline $V_2O_5$ while the 300° C. calcined Sorbent A sample (FIG. 5) indicates little or no crystalline $V_2O_5$.

Sorbent B—(Around 3 wt. % Vanadium)

The above data in Table 2 also suggest a significant difference between the hydrated and dried Sorbent B sample. Although the high values for the linewidth at half-height indicate that both of the Sorbent B samples are amorphous, the second principal component of chemical shift anisotropy (δ 22) values suggest that vanadium in the hydrated sorbent has a distorted octahedral symmetry whereas the dried sample has the vanadium in a distorted tetrahedral symmetry.

Reasonable variations, modifications and adaptations can be made within the scope of the disclosure and appended claims without departing from the scope of the present invention.

That which is claimed is:

1. A composition comprising silica and vanadium wherein at least a portion of said vanadium is present as a distorted octahedral and in a phase selected from the group consisting of amorphous, nano-crystalline, and combinations thereof.

2. A composition in accordance with claim 1 wherein at least about 10 weight percent of said vanadium is present as a distorted octahedral and in a phase selected from the group consisting of amorphous, nano-crystalline, and combinations thereof.

3. A composition in accordance with claim 1 wherein at least about 80 weight percent of said vanadium is present as a distorted octahedral and in a phase selected from the group consisting of amorphous, nano-crystalline, and combinations thereof.

4. A composition in accordance with claim 1 wherein at least about 95 weight percent of said vanadium is present as a distorted octahedral and in a phase selected from the group consisting of amorphous, nano-crystalline, and combinations thereof.

5. A composition in accordance with claim 1 wherein said silica has a surface area in the range of from about 20 m²/gram to about 800 m²/gram.

6. A composition in accordance with claim 1 wherein at least a portion of said vanadium has crystallite sizes of less than about 100 Å as determined by an analytical method.

7. A composition in accordance with claim 1 wherein at least a portion of said vanadium has crystallite sizes of less than about 30 Å as determined by an analytical method.

8. A composition in accordance with claim 1 wherein less than about 20 wt. percent of said vanadium is present as crystalline $V_2O_5$ as determined by an analytical method.

9. A composition in accordance with claim 1 wherein less than about 5 wt. percent of said vanadium is present as crystalline $V_2O_5$ as determined by an analytical method.

10. A composition in accordance with claim 1 wherein said composition is hydrated.

11. A composition in accordance with claim 1 wherein at least a portion of said vanadium is present in said composition in the form of an oxide of vanadium and wherein the vanadium atom has oxygen atoms as its six nearest neighbors.

12. A composition in accordance with claim 1 wherein said vanadium is present in said composition, on an elemental vanadium basis, in an amount in the range of from about 0.5 to about 50 wt. percent, based on the total weight of said composition.

13. A composition in accordance with claim 1 wherein said vanadium is present in said composition, on an elemental vanadium basis, in an amount in the range of from about 1 to about 20 wt. percent, based on the total weight of said composition.

14. A composition in accordance with claim 1 wherein said vanadium is present in said composition, on an elemental vanadium basis, in an amount in the range of from about 1.5 to about 15 wt. percent, based on the total weight of said composition.

15. A composition consisting essentially of silica and vanadium wherein at least a portion of said vanadium is present as a distorted octahedral and in a phase selected from the group consisting of amorphous, nano-crystalline, and combinations thereof.

16. A composition consisting of silica and vanadium and oxygen wherein at least a portion of said vanadium is present as a distorted octahedral and in a phase selected from the group consisting of amorphous, nano-crystalline, and combinations thereof.

17. A composition comprising silica and vanadium heated in the presence of oxygen and a solvent to a calcination temperature, followed by hydration; wherein said calcination temperature is sufficient to volatilize and remove substantially all of the solvent; and wherein said calcination temperature is below the temperature which would result in the conversion of greater than about 90 weight percent of the vanadium to vanadium-and-oxygen-containing crystallites greater than about 100Å in size.

18. A composition in accordance with claim 17 wherein said solvent is an aqueous solution of oxalic acid.

19. A composition in accordance with claim 17 wherein said composition is heated at said calcination temperature for a time period in the range of from about 0.1 to about 24 hours.

20. A composition in accordance with claim 17 wherein said composition is heated at said calcination temperature for a time period in the range of from about 1 to about 4 hours.

21. A composition in accordance with claim 17 wherein said vanadium is present in said composition, on elemental vanadium basis, in an amount in the range of from about 0.5 to about 50 wt. percent, based on a total weight of said composition.

22. A composition in accordance with claim 17 wherein said vanadium is present in said composition, on elemental vanadium basis, in an amount in the range of from about 1.0 to about 20 wt. percent, based on a total weight of said composition.

23. A composition in accordance with claim 17 wherein said vanadium is present in said composition, on elemental vanadium basis, in an amount in the range of from about 1.5 to about 15 wt. percent, based on a total weight of said composition.

24. A composition comprising silica and vanadium heated in the presence of oxygen and a solvent to a calcination temperature; wherein said calcination temperature is sufficient to volatilize and remove substantially all of the solvent; and wherein said calcination temperature is below about 325° C.

25. A composition in accordance with claim 24 wherein said calcination temperature is below about 300° C.

26. A composition in accordance with claim 24 wherein said calcination temperature is below about 275° C.

27. A composition prepared by the method of:
  a) incorporating a vanadium compound onto, into, or onto and into silica, in the presence of an oxidizing agent and a solvent, to thereby form a vanadium incorporated silica; and
  b) calcining said vanadium incorporated silica in the presence of oxygen and said solvent at a calcination temperature; wherein said calcination temperature is sufficient to volatilize and remove substantially all of the solvent; and wherein said calcination temperature is below the temperature which would result in the conversion of greater than about 90 weight percent of the vanadium to vanadium-and-oxygen-containing crystallites greater than about 100 Å in size, to thereby form said composition comprising silica, vanadium and oxygen.

28. A composition in accordance with claim 27 wherein said solvent is an aqueous solution of oxalic acid.

29. A composition in accordance with claim 27 wherein said composition is hydrated.

30. A composition in accordance with claim 27 wherein said vanadium incorporated silica is calcined at said calcination temperature for a time period in the range of from about 0.1 to about 24 hours.

31. A composition in accordance with claim 27 wherein said vanadium is present in said composition, on elemental vanadium basis, in an amount in the range of from about 0.5 to about 50 wt. percent, based on the total weight of said composition.

32. A composition in accordance with claim 27 wherein said vanadium is present in said composition, on elemental vanadium basis, in an amount in the range of from about 1.0 to about 20 wt. percent, based on the total weight of said composition.

33. A composition in accordance with claim 27 wherein said vanadium is present in said composition, on elemental vanadium basis, in an amount in the range of from about 1.5 to about 15 wt. percent, based on the total weight of said composition.

34. A composition in accordance with claim 27 wherein said oxidizing agent is hydrogen peroxide.

35. A composition in accordance with claim 27 wherein said vanadium compound is selected from the group consisting of: 1) ammonium metavanadate, 2) an alkali metavanadate of the formula $MVO_3$ wherein M can be an alkali metal selected from Group IA, and 3) combinations of any two or more thereof.

36. A method comprising:
  a) incorporating a vanadium compound onto, into, or onto and into silica, in the presence of an oxidizing agent and a solvent, to thereby form a vanadium incorporated silica; and
  b) calcining said vanadium incorporated silica in the presence of oxygen and said solvent at a calcination temperature; wherein said calcination temperature is sufficient to volatilize and remove substantially all of the solvent; and wherein said calcination temperature is below the temperature which would result in the conversion of greater than about 90 weight percent of the vanadium to vanadium-and-oxygen-containing crystallites greater than about 100 Å in size, to thereby form said composition.

37. A method in accordance with claim 36 wherein said solvent is an aqueous solution of oxalic acid.

38. A method in accordance with claim 36 wherein said composition is hydrated.

39. A method in accordance with claim 36 wherein said vanadium incorporated silica is calcined at said calcination temperature for a time period in the range of from about 0.1 to about 24 hours.

40. A method in accordance with claim 36 wherein said vanadium is present in said composition, on elemental vanadium basis, in an amount in the range of from about 0.5 to about 50 wt. percent, based on the total weight of said composition.

41. A method in accordance with claim 36 wherein said vanadium is present in said composition, on elemental vanadium basis, in an amount in the range of from about 1.0 to about 20 wt. percent, based on the total weight of said composition.

42. A method in accordance with claim 36 wherein said vanadium is present in said composition, on elemental vanadium basis, in an amount in the range of from about 1.5 to about 15 wt. percent, based on the total weight of said composition.

43. A method in accordance with claim 36 wherein said oxidizing agent is hydrogen peroxide.

44. A method in accordance with claim 36 wherein said vanadium compound is selected from the group consisting of: 1) ammonium metavanadate, 2) an alkali metavanadate of the formula $MVO_3$, wherein M is an alkali metal selected from Group IA; and 3) combinations of any two or more thereof.

45. A process comprising:
  a) contacting, in a contacting zone, a gaseous feed stream comprising a heavy metal and oxygen with the composition of claim 1; and
  b) withdrawing a gaseous product stream from said contacting zone.

46. A process as recited in claim 45 wherein said gaseous product stream contains less heavy metal than said gaseous feed stream.

47. A process as recited in claim 45 wherein said gaseous feed stream further comprises a contaminant selected from the group consisting of sulfur oxides, CO$_2$, water, nitrogen oxides, HCl, and combinations of any two or more thereof.

48. A process as recited in claim 45 wherein said gaseous feed stream is a combustion gas.

49. A process as recited in claim 45 wherein said gaseous feed stream is a stack gas derived from the combustion of coal.

50. A process as recited in claim 45 wherein said contacting of step a) is carried out at a temperature in the range of from about 100 to about 325° C.

51. A process as recited in claim 45 wherein said contacting of step a) is carried out at a temperature in the range of from about 125 to about 275° C.

52. A process as recited in claim 45 wherein said contacting of step a) is carried out at a temperature in the range of from about 150 to about 225° C.

53. A process as recited in claim 45 wherein said heavy metal comprises a metal selected from the group consisting of arsenic, beryllium, lead, cadmium, chromium, nickel, zinc, mercury, barium, and combinations of any two or more thereof.

54. A process as recited in claim 53 wherein said heavy metal is mercury.

55. A process as recited in claim 54 wherein said composition converts at least a portion of said mercury in said gaseous feed stream from a zero oxidation state to a +1 or a +2 oxidation state.

56. A process as recited in claim 54 wherein said mercury is present in said gaseous feed stream in an amount in the range of from about 0.1 to about 10,000 μg/m$^3$.

57. A process as recited in claim 54 wherein said mercury is present in said gaseous feed stream in an amount in the range of from about 1 to about 800 μg/m$^3$.

58. A process as recited in claim 54 wherein said mercury is present in said gaseous feed stream in an amount in the range of from about 3 to about 700 μg/m$^3$.

59. A process as recited in claim 54 wherein said gaseous product stream contains less than about 20 weight % of the mercury contained in said gaseous feed stream.

60. A process as recited in claim 54 wherein said gaseous product stream contains less than about 10 weight % of the mercury contained in said gaseous feed stream.

61. A process as recited in claim 54 wherein said gaseous product stream contains less than about 5 weight % of the mercury contained in said gaseous feed stream.

62. A process as recited in claim 45 wherein said gaseous product stream is contacted, in an adsorption zone, with an adsorbent.

63. A process recited in claim 62 wherein said adsorbent is selected from the group consisting of a zeolite, amorphous carbon, and combinations thereof.

64. A process as recited in claim 63 wherein said composition oxidizes at least a portion of said heavy metal in said gaseous feed stream to an elevated oxidation state.

65. A process as recited in claim 63 wherein said heavy metal is mercury and wherein said composition oxidizes at least a portion of said mercury in said gaseous feed stream from a zero oxidation state to a +1 or a +2 oxidation state.

66. process as recited in claim 63 wherein a treated gaseous product stream is withdrawn from said adsorption zone.

67. A process as recited in claim 66 wherein said treated gaseous product stream contains less than about 20 weight % of the heavy metal contained in said gaseous feed stream.

68. A process as recited in claim 66 wherein said treated gaseous product stream contains less than about 10 weight % of the heavy metal contained in said gaseous feed stream.

69. A process as recited in claim 66 wherein said treated gaseous product stream contains less than about 5 weight % of the heavy metal contained in said gaseous feed stream.

70. A process comprising:
a) contacting, in a contacting zone, a gaseous feed stream comprising a heavy metal and oxygen with the composition of claim 24; and
b) withdrawing a gaseous product stream from said contacting zone.

71. A process as recited in claim 70 wherein said gaseous product stream contains less heavy metal than said gaseous feed stream.

72. A process as recited in claim 70 wherein said gaseous feed stream further comprises a contaminant selected from the group consisting of sulfur oxides, CO$_2$, water, nitrogen oxides, HCl, and combinations of any two or more thereof.

73. A process as recited in claim 70 wherein said gaseous feed stream is a combustion gas.

74. A process as recited in claim 70 wherein said gaseous feed stream is a stack gas derived from the combustion of coal.

75. A process as recited in claim 70 wherein said contacting of step a) is carried out at a temperature in the range of from about 100 to about 325° C.

76. A process as recited in claim 70 wherein said contacting of step a) is carried out at a temperature in the range of from about 125 to about 275° C.

77. A process as recited in claim 70 wherein said contacting of step a) is carried out at a temperature in the range of from about 150 to about 225° C.

78. A process as recited in claim 70 wherein said heavy metal comprises a metal selected from the group consisting of arsenic, beryllium, lead, cadmium, chromium, nickel, zinc, mercury, barium, and combinations of any two or more thereof.

79. A process as recited in claim 78 wherein said heavy metal is mercury.

80. A process as recited in claim 79 wherein said composition converts at least a portion of said mercury in said gaseous feed stream from a zero oxidation state to a +1 or a +2 oxidation state.

81. A process as recited in claim 79 wherein said mercury is present in said gaseous feed stream in an amount in the range of from about 0.1 to about 10,000 μg/m$^3$.

82. A process as recited in claim 79 wherein said mercury is present in said gaseous feed stream in an amount in the range of from about 1 to about 800 μg/m$^3$.

83. A process as recited in claim 79 wherein said mercury is present in said gaseous feed stream in an amount in the range of from about 3 to about 700 μg/m$^3$.

84. A process as recited in claim 79 wherein said gaseous product stream contains less than about 20 weight % of the mercury contained in said gaseous feed stream.

85. A process as recited in claim 79 wherein said gaseous product stream contains less than about 10 weight % of the mercury contained in said gaseous feed stream.

86. A process as recited in claim 79 wherein said gaseous product stream contains less than about 5 weight % of the heavy metal contained in said gaseous feed stream.

87. A process as recited in claim 70 wherein said gaseous product stream is contacted, in an adsorption zone, with an adsorbent.

88. A process as recited in claim 87 wherein said adsorbent is selected from the group consisting of a zeolite, amorphous carbon, and combinations thereof.

89. A process as recited in claim 88 wherein said composition oxidizes at least a portion of said heavy metal in said gaseous feed stream to an elevated oxidation state.

90. A process as recited in claim 88 wherein said heavy metal is mercury and wherein said composition oxidizes at least a portion of said mercury in said gaseous feed stream from a zero oxidation state to a +1 or a +2 oxidation state.

91. A process as recited in claim 88 wherein a treated gaseous product stream is withdrawn from said adsorption zone.

92. A process as recited in claim 91 wherein said treated gaseous product stream contains less than about 20 weight % of the heavy metal contained in said gaseous feed stream.

93. A process as recited in claim 91 wherein said treated gaseous product stream contains less than about 10 weight % of the heavy metal contained in said gaseous feed stream.

94. A process as recited in claim 91 wherein said treated gaseous product stream contains less than about 5 weight % of the heavy metal contained in said gaseous feed stream.

95. A process comprising:
   a) contacting, in a contacting zone, a gaseous feed stream comprising a heavy metal and oxygen with the composition of claim 27; and
   b) withdrawing a gaseous product stream from said contacting zone.

96. A process as recited in claim 95 wherein said gaseous product stream contains less heavy metal than said gaseous feed stream.

97. A process as recited in claim 95 wherein said gaseous feed stream further comprises a compound selected from the group consisting of sulfur oxides, $CO_2$, water, nitrogen oxides, HCl, and combinations of any two or more thereof.

98. A process as recited in claim 95 wherein said gaseous feed stream is a combustion gas.

99. A process as recited in claim 95 wherein said gaseous feed stream is a stack gas derived from the combustion of coal.

100. A process as recited in claim 95 wherein said contacting of step a) is carried out at a temperature in the range of from about 100 to about 325° C.

101. A process as recited in claim 95 wherein said contacting of step a) is carried out at a temperature in the range of from about 125 to about 275° C.

102. A process as recited in claim 95 wherein said contacting of step a) is carried out at a temperature in the range of from about 150 to about 225° C.

103. A process as recited in claim 95 wherein said heavy metal comprises a metal selected from the group consisting of arsenic, beryllium, lead, cadmium, chromium, nickel, zinc, mercury, barium, and combinations of any two or more thereof.

104. A process as recited in claim 103 wherein said heavy metal is mercury.

105. A process as recited in claim 104 wherein said composition converts at least a portion of said mercury in said gaseous feed stream from a zero oxidation state to a +1 or a +2 oxidation state.

106. A process as recited in claim 104 wherein said mercury is present in said gaseous feed stream in an amount in the range of from about 0.1 to about 10,000 $\mu g/m^3$.

107. A process as recited in claim 104 wherein said mercury is present in said gaseous feed stream in an amount in the range of from about 1 to about 800 $\mu g/m^3$.

108. A process as recited in claim 104 wherein said mercury is present in said gaseous feed stream in an amount in the range of from about 3 to about 700 $\mu g/m^3$.

109. A process as recited in claim 104 wherein said gaseous product stream contains less than about 20 weight % of the mercury contained in said gaseous feed stream.

110. A process as recited in claim 104 wherein said gaseous product stream contains less than about 10 weight % of the mercury contained in said gaseous feed stream.

111. A process as recited in claim 104 wherein said gaseous product stream contains less than about 5 weight % of the mercury contained in said gaseous feed stream.

112. A process as recited in claim 95 wherein said gaseous product stream is contacted, in an adsorption zone, with an adsorbent.

113. A process as recited in claim 111 wherein said adsorbent is selected from the group consisting of a zeolite, amorphous carbon, and combinations thereof.

114. A process as recited in claim 113 wherein said composition oxidizes at least a portion of said heavy metal in said gaseous feed stream to an elevated oxidation state.

115. A process as recited in claim 113 wherein said heavy metal is mercury and wherein said composition oxidizes at least a portion of said mercury in said gaseous feed stream from a zero oxidation state to a +1 or a +2 oxidation state.

116. A process as recited in claim 113 wherein a treated gaseous product stream is withdrawn from said adsorption zone.

117. A process as recited in claim 116 wherein said treated gaseous product stream contains less than about 20 weight % of the heavy metal contained in said gaseous feed stream.

118. A process as recited in claim 116 wherein said treated gaseous product stream contains less than about 10 weight % of the heavy metal contained in said gaseous feed stream.

119. A process as recited in claim 116 wherein said treated gaseous product stream contains less than about 5 weight % of the heavy metal contained in said gaseous feed stream.

* * * * *